US008044951B1

(12) United States Patent
Brown et al.

(10) Patent No.: US 8,044,951 B1
(45) Date of Patent: Oct. 25, 2011

(54) INTEGER-BASED FUNCTIONALITY IN A GRAPHICS SHADING LANGUAGE

(75) Inventors: Patrick R. Brown, Raleigh, NC (US); Barthold B. Lichtenbelt, Fort Collins, CO (US); Christopher T. Dodd, Woodside, CA (US)

(73) Assignee: NVIDIA Corporation, Santa Clara, CA (US)

( * ) Notice: Subject to any disclaimer, the term of this patent is extended or adjusted under 35 U.S.C. 154(b) by 852 days.

(21) Appl. No.: 11/565,543

(22) Filed: Nov. 30, 2006

Related U.S. Application Data

(63) Continuation-in-part of application No. 10/883,893, filed on Jul. 2, 2004, now Pat. No. 7,426,724.

(60) Provisional application No. 60/833,978, filed on Jul. 28, 2006.

(51) Int. Cl.
*G06T 15/00* (2011.01)
*G06T 15/50* (2011.01)
*G06T 15/60* (2006.01)
*G06F 9/44* (2006.01)

(52) U.S. Cl. .................. 345/419; 345/426; 717/162

(58) Field of Classification Search .................. 345/419, 345/426; 717/162
See application file for complete search history.

(56) References Cited

U.S. PATENT DOCUMENTS

| | | | |
|---|---|---|---|
| 5,005,137 A | | 4/1991 | Ernst |
| 5,109,481 A | * | 4/1992 | Lathrop et al. ............... 345/606 |
| 5,465,224 A | * | 11/1995 | Guttag et al. ................. 708/236 |
| 5,594,854 A | * | 1/1997 | Baldwin et al. ............... 345/441 |
| 5,798,770 A | * | 8/1998 | Baldwin ....................... 345/506 |
| 5,812,854 A | | 9/1998 | Steinmetz et al. |
| 5,870,097 A | | 2/1999 | Snyder et al. |
| 5,977,977 A | | 11/1999 | Kajiya et al. |
| 6,044,225 A | | 3/2000 | Spencer et al. |
| 6,269,384 B1 | * | 7/2001 | Oberman ....................... 708/497 |
| 6,342,892 B1 | * | 1/2002 | Van Hook et al. ............. 345/503 |
| 6,370,558 B1 | * | 4/2002 | Guttag et al. ................. 708/603 |
| 6,578,197 B1 | | 6/2003 | Peercy et al. |
| 6,724,394 B1 | * | 4/2004 | Zatz et al. ..................... 345/581 |
| 6,891,544 B2 | | 5/2005 | Oka et al. |
| 6,952,206 B1 | | 10/2005 | Craighead |
| 6,972,769 B1 | * | 12/2005 | Nebeker et al. ............... 345/552 |
| 6,982,718 B2 | | 1/2006 | Kilgard et al. |
| 6,983,456 B2 | | 1/2006 | Poznanovic et al. |
| 7,006,101 B1 | * | 2/2006 | Brown et al. .................. 345/561 |
| 7,009,615 B1 | | 3/2006 | Kilgard et al. |
| 7,015,915 B1 | | 3/2006 | Diard |
| 7,142,215 B1 | * | 11/2006 | Papakipos et al. ............. 345/506 |
| 7,159,212 B2 | * | 1/2007 | Schenk et al. ................. 717/153 |

(Continued)

OTHER PUBLICATIONS

William R. Mark , R. Steven Glanville , Kurt Akeley , Mark J. Kilgard, Cg: a system for programming graphics hardware in a C-like language, ACM Transactions on Graphics (TOG), v.22 n.3, Jul. 2003, pp. 896-907.*

(Continued)

*Primary Examiner* — Ulka Chauhan
*Assistant Examiner* — Roberta D Prendergast
(74) *Attorney, Agent, or Firm* — Patterson & Sheridan, LLP

(57) ABSTRACT

One embodiment of the present invention sets forth a technique for improving the flexibility and programmability of a graphics pipeline by adding application programming interface (API) extensions to the OpenGL Shading Language (GLSL) that provide native support for integer data types and operations. The integer API extensions span from the API to the hardware execution units within a graphics processing unit (GPU), thereby providing native integer support throughout the graphics pipeline.

23 Claims, 3 Drawing Sheets

U.S. PATENT DOCUMENTS

| | | | |
|---|---|---|---|
| 7,225,323 B2 * | 5/2007 | Siu et al. | 712/222 |
| 7,240,184 B2 * | 7/2007 | Siu et al. | 712/221 |
| 7,327,369 B2 * | 2/2008 | Morein et al. | 345/501 |
| 7,426,724 B2 | 9/2008 | Kilgard et al. | |
| 7,428,566 B2 * | 9/2008 | Siu et al. | 708/501 |
| 7,463,261 B1 * | 12/2008 | O'Donnell | 345/427 |
| 7,468,726 B1 * | 12/2008 | Wloka et al. | 345/421 |
| 7,548,238 B2 | 6/2009 | Berteig et al. | |
| 7,570,267 B2 * | 8/2009 | Patel et al. | 345/522 |
| 2001/0010051 A1 * | 7/2001 | Oberman et al. | 708/502 |
| 2001/0034876 A1 * | 10/2001 | Panchul et al. | 716/18 |
| 2002/0080143 A1 * | 6/2002 | Morgan et al. | 345/581 |
| 2002/0082081 A1 * | 6/2002 | Takeuchi | 463/32 |
| 2003/0020741 A1 | 1/2003 | Boland et al. | |
| 2003/0080963 A1 * | 5/2003 | Van Hook et al. | 345/501 |
| 2003/0105793 A1 * | 6/2003 | Guttag et al. | 708/625 |
| 2003/0210248 A1 * | 11/2003 | Wyatt | 345/541 |
| 2004/0003370 A1 * | 1/2004 | Schenk et al. | 717/100 |
| 2004/0012563 A1 * | 1/2004 | Papakipos et al. | 345/157 |
| 2004/0012596 A1 | 1/2004 | Allen et al. | |
| 2004/0012600 A1 * | 1/2004 | Deering et al. | 345/506 |
| 2004/0085312 A1 * | 5/2004 | Buchner et al. | 345/423 |
| 2004/0095348 A1 | 5/2004 | Bleiweiss et al. | |
| 2004/0158693 A1 | 8/2004 | Dagan et al. | |
| 2004/0169671 A1 | 9/2004 | Aronson et al. | |
| 2004/0183451 A1 * | 9/2004 | D'Amora | 315/100 |
| 2005/0195188 A1 * | 9/2005 | Goel et al. | 345/423 |
| 2005/0243094 A1 * | 11/2005 | Patel et al. | 345/506 |
| 2006/0098017 A1 * | 5/2006 | Tarditi et al. | 345/505 |
| 2006/0114260 A1 | 6/2006 | Diard | |
| 2007/0018980 A1 | 1/2007 | Berteig et al. | |
| 2008/0074431 A1 | 3/2008 | Bakalash et al. | |

OTHER PUBLICATIONS

R. Fernando and M. Kilgard, "The Cg Tutorial: The Definitive Guide to Programmable Real-Time Graphics", Addison-Wesley, 2003, 104 pages.*

Kessenich, et al., 2003, "The OpenGL Shading Language", 112 pages, downloaded from http://www.opengl.org/documentation/oglsl.html.*

Kolb, et al., "Hardware-based simulation and collision detection for large particle systems", Proceedings of the ACM SIGGRAPH/EUROGRAPHICS Conference on Graphics Hardware, Aug. 29-30, 2004, HWWS '04, ACM, NY, NY, pp. 123-131.*

Akeley et al., "ARB_vertex_program", Version: Last Modified May 1, 2003, Revision 42, pp. 1-82, http://www.nvidia.com/dev_content/nvopenglspecs/GL_ARB_vertex_program.txt.*

Beretta et al., "ARB_fragment_program", Revision 24, Jan. 10, 2003, 55 pages, http://www.nvidia.com/dev_content/nvopenglspecs/GL_ARB_fragment_program.txt.*

Pat Brown et al., "NV vertex_program2", NVIDIA Corporation, Last Modified May 16, 2004, NVIDIA Revision 32, pp. 1-44, http://www.nvidia.com/dev_content/nvopenglspecs/GL_NV_vertex_program2.txt.*

Pat Brown, NV_vertex_program3, NVIDIA Corporation, Last Modified Date May 17, 2004, NVIDIA Revision 1, pp. 1-12, http://www.nvidia.com/dev_content/nvopenglspecs/GL_NV_vertex_program3.txt.*

Brown et al., GL_NV_fragment_program, Revision 73, May 24, 2005, 51 pages, http://www.nvidia.com/dev_content/nvopenglspecs/GL_NV_fragment_program.txt.*

Brown et al. GL_NV_fragment_program2, Revision 6, May 17, 2004, 12 pages, http://www.nvidia.com/dev_content/nvopenglspecs/GL NV fragment_program2.txt.*

Hao, X. and Varshney, A. 2001. Variable-precision rendering. In Proceedings of the 2001 Symposium on interactive 3D Graphics I3D '01. ACM, New York, NY, pp. 149-158, http://portal.acm.org/citation.cfm?id=364338.364384.*

Mark J. Kilgard, NV_texture_rectangle, NVIDIA Corporation, No. 229, Mar. 5, 2004, pp. 1-15, http://www.opengl.org/registry/specs/NV/texture_rectangle.txt.*

Mark J. Kilgard, "NVIDIA OpenGL 2.0 Support", NVIDIA Corporation, Apr. 26, 2005, pp. 1-22, http://http.download.nvidia.com/developer/Papers/2005/OpenGL_2.0/NVIDIA_OpenGL_2.0_Support.pdf.*

Mark J. Kilgard, NV_vertex_program, NVIDIA Corporation, Version 1.9, Feb. 24, 2004, pp. 1-49, http://www.nvidia.com/dev_content/nvopenglspecs/GL_NV_vertex_program.txt.*

Lefohn, et al., "Interactive Deformation and Visualization of Level Set Surfaces Using Graphics Hardware", Proceedings of the 14th IEEE Visualization 2003 (Vis'03), Oct. 22-24, 2003, IEEE Visualization. IEEE Computer Society, 11, pp. 75-82, http://portal.acm.org/citation.cfm?id=1081432.1081455.*

A. Lovesey, "A Comparison of Real Time Graphical Shading Languages", University of New Brunswick Canada, CS4983 Senior Technical Report, Mar. 26, 2005, 70 pages, http://scholar.google.com/scholar?cluster=1158069024545843559&hl=en&as_sdt=2001.*

Olano, M. and Lastra, A. 1998. A shading language on graphics hardware: the pixelflow shading system. In Proceedings of the 25th Annual Conference on Computer Graphics and interactive Techniques SIGGRAPH '98. ACM, New York, NY, pp. 159-168, http://portal.acm.org/citation.cfm?id=280814.280857&type=series.*

Olano, et al., "Real-Time Shading: SIGGRAPH 2004 Course 1 Notes". Proceedings of the 25th Annual Conference on Computer Graphics and interactive Techniques SIGGRAPH 2004, Aug. 24, 2004, ACM, New York, NY, 238 pages, http://portal.acm.org/citation.cfm?id=1103900.1103901.*

Purnomo, B., Bilodeau, J., Cohen, J. D., and Kumar, S. 2005. Hardware-compatible vertex compression using quantization and simplification. In Proceedings of the ACM SIGGRAPH/EUROGRAPHICS Conference on Graphics Hardware (Los Angeles, California, Jul. 30-31, 2005). HWWS '05. ACM, New York, NY, pp. 53-61, http://portal.acm.org/citation.cfm?id=107.*

Wei, L. 2004. Tile-based texture mapping on graphics hardware. In Proceedings of the ACM SIGGRAPH/EUROGRAPHICS Conference on Graphics Hardware (Grenoble, France, Aug. 29-30, 2004). HWWS '04. ACM, New York, NY, pp. 55-63, http://portal.acm.org/citation.cfm?id=1058129.1058138.*

R. Fernando and M. Kilgard, "The Cg Tutorial: The Definitive Guide to Programmable Real-Time Graphics", Addison-Wesley, 2003, Chapters 3 and 5, 83 pages.*

Lipchak et al., "GL_ARB_draw_buffers", Revision 14, Jul. 26, 2004, 11 pages, available at: http://www.nvidia.com/dev_content/nvopenglspecs/GL_ARB_draw_buffers.txt.*

Segal et al., Oct. 30, 2003, "The OpenGL(R) Graphics System: A Specification (Version 1.5)", 115 pages, available at: http://www.opengl.org/documentation/specs/version1.5/glspec15.pdf.*

Rost, R. J., Feb. 12, 2004, "OpenGL(R) Shading Language", Addison Wesley Longman Publishing Co., Inc., 60 pages.*

Astle et al., "Austin Game Conference 2005 Report", Oct. 26-28, 2005, 16 pages, available at: http://www.gamedev.net/reference/articles/article2274.asp.*

Bleiweiss, Avi, "Shading Compilers", SIGGRAPH 2005, Course 37, GPU Shading and Rendering (GSR), Chapter 3, Aug. 2, 2005, 22 pages available at: http://developer.amd.com/media/gpu_assets/GSR05CH03Notes.pdf.*

Brumme, S., "The OpenGL Shading Language", Seminar on Analysis, Conception and Architecture of Computer Graphics Systems, HAsso-Platner-Institut, Universität Potsdam, Jan. 2004, 14 pages, available at: http://www.stephan-brumme.com/download/shader/GLSL.pdf.*

Folkegård N., Wesslén D.: "Dynamic code generation for realtime shaders", In Linköping Electronic Conference Proceedings (Nov. 24-25, 2004), pp. 11-15.*

Lipchak, Benj, "GL_ATI_draw_buffers", Revision 8, Dec. 30, 2002, 7 pages, available at: http://www.nvidia.com/dev_content/nvopenglspecs/GL_ATI_draw_buffers.txt.*

D. Bartz, C. Silva, and B. Schneider, "Rendering and Visualization in Parallel Environments", ACM SIGGRAPH, Course13, Jul. 2000, 51 pages.* de Carvalho, et al., Apr. 2004, "X3D programmable shaders", Proceedings of the ninth international conference on 3D Web technology (Web3D '04), ACM, New York, NY, USA, pp. 99-108.*

Randima Fernando, "GPU Gems," Chapter 28, NVIDIA Corp., printing Apr. 2004, 18 pages, retrieved from: http://http.download.nvidia.com/developer/GPU_Gems/Sample_Chapters/Graphics_Pipeline_Performance.pdf.*

Joel McCormack, et al., 1998, "Neon: a single-chip 3D workstation graphics accelerator", Proceedings of the ACM SIGGRAPH/ EUROGRAPHICS workshop on Graphics hardware (HWWS'98), Stephen N. Spencer (Ed.), ACM, New York, NY, USA, pp. 123-132.*
Montrym, J.; Moreton, H.; "The GeForce 6800," IEEE Micro, vol. 25, Issue 2, pp. 41-51, Mar.-Apr. 2005.*

Office Action. U.S. Appl. No. 11/565,566 dtd Jun. 9, 2009.
Notice of Allowance, U.S. Appl. No. 11/565,566, dated Nov. 4, 2009.
Office Action. U.S. Appl. No. 11/565,585, dated Aug. 25, 2010.
Notice of Allowance, U.S. Appl. No. 11/565,585, dated Feb. 2, 2011.

* cited by examiner

INTEGER-BASED FUNCTIONALITY IN A GRAPHICS SHADING LANGUAGE

CROSS-REFERENCE TO RELATED APPLICATIONS

The current application claims the benefit of U.S. Provisional Application No. 60/833,978, filed on Jul. 28, 2006 and having the title, "API Extensions for Advanced Graphics Processing Units." This related application is hereby incorporated by reference in its entirety. The current application also is a continuation-in-part of U.S. application Ser. No. 10/883,893, filed on Jul. 2, 2004 now U.S. Pat. No. 7,426,724 and having the title, "Optimized Chaining of Vertex and Fragment Programs." This additional related application is also hereby incorporated by reference in its entirety.

BACKGROUND OF THE INVENTION

1. Field of the Invention

Embodiments of the present invention generally relate to graphics programming and more specifically to integer-based functionality in a graphics shading language.

2. Description of the Related Art

Over the past decade, the cost of adding on-chip logic to processors has substantially decreased. Consequently, certain types of processors, such as advanced graphics processing units (GPUs), now include functionality not previously available in earlier GPU designs. For example, the newest GPUs are now able to perform full integer processing operations; whereas, such operations could not be effectively performed on the GPU. One benefit of this new capability is that more efficient graphics processing may now be performed on the GPU, thereby increasing overall performance in the graphics pipeline.

To fully realize additional processing capabilities of advanced GPUs, as much GPU functionality as possible needs to be exposed to graphics application developers. Among other things, doing so enables graphics application developers to tailor their shader programs to optimize the way GPUs process graphics scenes and images. Exposing new GPU processing capabilities, like full integer processing, to graphics application developers requires that the application programming interface (API) be configured with new calls and libraries that make new features and functionalities directly accessible by developers.

Some graphics APIs expose an interface to graphics application developers that consists of a set of calls written in a high-level programming language. To access specific capabilities of a target GPU, graphics application developers typically write shader programs for the target GPU in a high-level programming language such as the OpenGL shading language (GLSL). The shader programs are conveyed through the API to driver software that is configured to compile and assemble the shader programs into machine code programs. The machine code programs are then executed on the appropriate GPU processing units, as specified in the original shader program text.

As is well-known, floating-point values are useful in representing parameters related to graphics image data, such as light intensity or object depth, floating-point values are inappropriate in more general data processing that involve bit-wise operators or data structure indices. Integer values, however, are commonly used for processing bit-wise operators and computing data structure indices. Therefore, shader programs include constructs for storing and processing data in both integer and floating-point formats. One drawback of prior art APIs is that values that are encoded within the shader program using an integer format are not guaranteed to be processed using integer data types within a target GPU. In fact, integer variables within prior art APIs are typically converted to a floating-point format for processing within the GPU, precluding many integer related functions such as bit-wise and pointer operators. For example, in OpenGL™ an integer value "2" used within a shader program is actually converted to a floating-point value "2.0" for processing within the GPU since integers are not supported as a native data type within the existing OpenGL™ API. The fact that OpenGL™ always casts values to a floating-point representation for processing within the GPU limits the applicability of OpenGL™ and GLSL to more general computational tasks desirable is more advanced graphics pipeline architectures. This API limitation thus restricts developers from taking advantage of native integer math support recently added to a new generation of GPUs.

As the foregoing illustrates, what is needed in the art is an application programming interface that exposes new processing capabilities of GPUs, such as the ability to perform native integer math operations, to graphics application developers.

SUMMARY OF THE INVENTION

One embodiment of the present invention sets forth a method for processing integer data operations on a graphics processing unit. The method includes the steps of receiving a first shader program configured to be executed by a first shader unit in the graphics processing unit and a second shader program configured to be executed by a second shader unit in the graphics processing unit, wherein both the first shader program and the second shader program include instructions written in a high-level shading language, and wherein the instructions include integer data operations; converting the high-level shading language instructions of the first shader program and the second shader program into assembly code; linking the assembly code instructions of the first shader program with the assembly code instructions of the second shader program; and converting the linked assembly code instructions of the first shader program and the second shader program into microcode instructions that can be executed on the graphics processing unit. The method also includes the step of transmitting the microcode instructions of the first shader program to the first shader unit and the microcode instructions of the second shader program to the second shader unit.

One advantage of the disclosed method is that it enables graphics application developers to program with integer data types that can then be passed by a software driver to an advanced graphics processing unit that is configured to perform full integer data operations.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
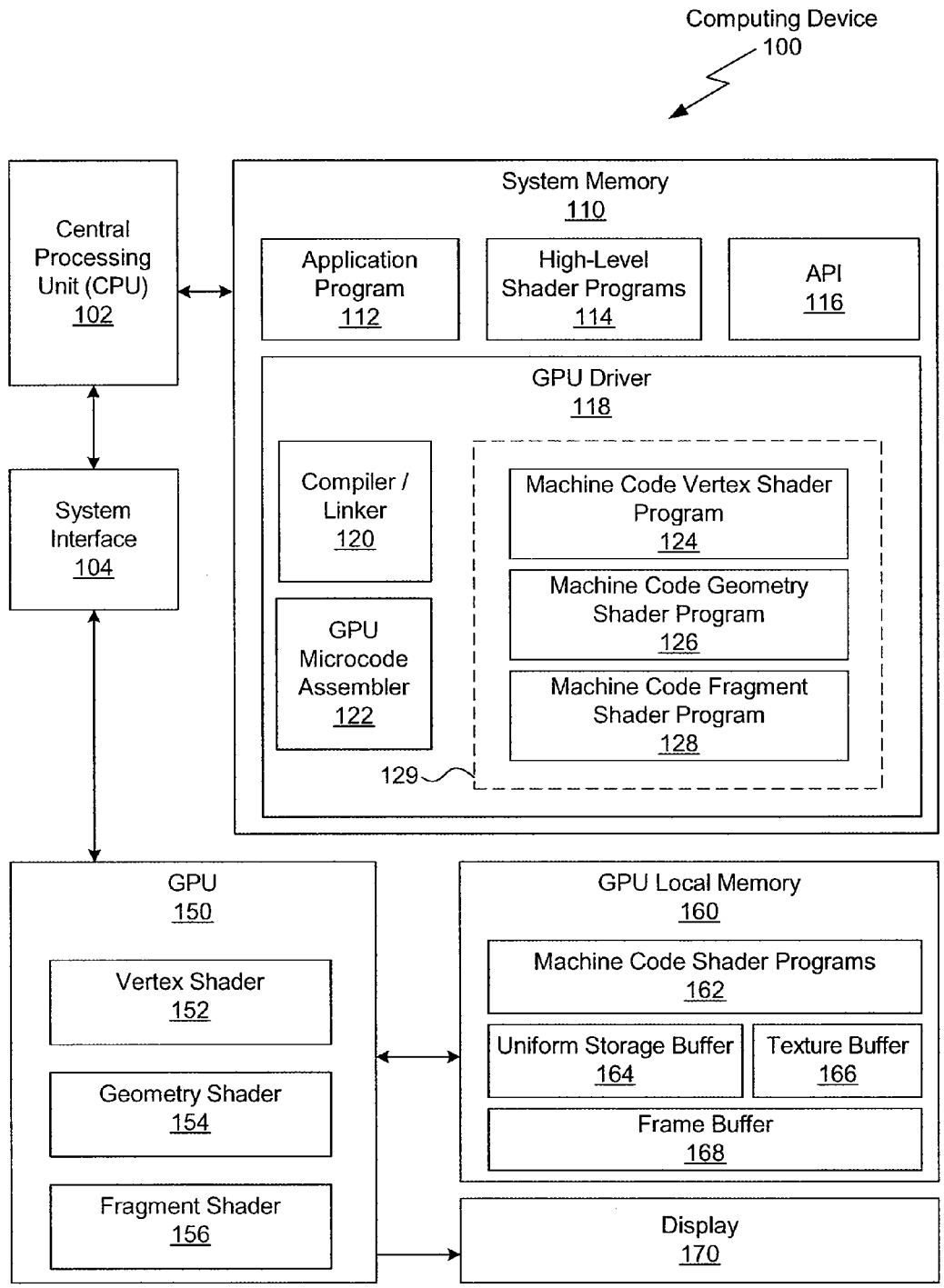
FIG. 1 is a conceptual diagram of a computing device configured to implement one or more aspects of the present invention.

FIG. 1 is a conceptual diagram of a computing device 100 configured to implement one or more aspects of the present invention. The computing device 100 includes a central processing unit (CPU) 102, a system interface 104, a system memory 110, a GPU 150, a GPU local memory 160 and a display 170. The CPU 102 connects to the system memory 110 and the system interface 104. The CPU 102 executes programming instructions stored in the system memory 110, operates on data stored in system memory 110 and communicates with the GPU 150 through the system interface 104, which bridges communication between the CPU 102 and GPU 150. In alternate embodiments, the CPU 102, GPU 150, system interface 104, or any combination thereof, may be integrated into a single processing unit. Further, the functionality of GPU 150 may be included in a chipset of in some other type of special purpose processing unit or co-processor. The system memory 110 stores programming instructions and data for processing by the CPU 102. The system memory 110 typically includes dynamic random access memory (DRAM) configured to either connect directly to the CPU 102 (as shown) or alternately, via the system interface 104. The GPU 150 receives instructions transmitted by the CPU 102 and processes the instructions in order to render graphics data and images stored in the GPU local memory 160. The GPU 150 displays certain graphics images stored in the GPU local memory 160 on the display 170.

The system memory 110 includes an application program 112, one or more high-level shader programs 114, an API 116 and a GPU driver 118. The application program 112 generates calls to the API 116 in order to produce a desired set of results, typically in the form of a sequence of graphics images. The application program 112 also transmits one or more high-level shading programs 114 to the API 116 for processing within the GPU driver 118. The high-level shading programs are typically source code text of high-level programming instructions that are designed to operate on one or more shaders within the GPU 150. The API 116 functionality is typically implemented within the GPU driver 118. The GPU driver 118 includes a compiler/linker 120 configured to process the high-level shader programs 114 into program objects that are typically represented by assembly language text optimized for a specific shader or shaders. A GPU microcode assembler 122 processes the program objects into machine code shader programs that may include a machine code vertex shader program 124, a machine code geometry shader program 126 and a machine code fragment shader program 128. In alternate embodiments, the compiler/linker directly generates the machine code shader programs 124, 126, 128 without the need for an intermediate assembly language version of the shader programs. A linked shader program image 129 is generated by linking the individual shader programs 124, 126, 128.

The GPU local memory 160 includes a set of machine code shader programs 162, a uniform storage buffer 164, a texture buffer 166 and a frame buffer 168. The machine code shader programs 162 are transmitted from the GPU driver 118 to GPU local memory 160. The machine code shader programs 162 may include, without limitation, the machine code vertex shader program 124, the machine code geometry shader program 126, the machine code fragment shader program 128, or any number of variations of each. The uniform storage buffer 164 stores one or more uniform variables, also called "uniforms." A uniform variable is held constant during a given invocation of the associated shader but may be altered between invocations. The texture buffer 166 stores data elements typically organized in one-dimensional, two-dimensional or three-dimensional structures. Data stored within the texture buffer 166 is typically accessed with the assistance of application specific hardware that provides for a dimensional access view of the data. For example a two-dimensional surface may be addressed with the assistance of a hardware unit that transposes a horizontal and vertical surface location into a physical memory address that corresponds to the location. The frame buffer 168 includes at least one two-dimensional surface that is used to drive the display 170. The frame buffer 168 may include more than one two-dimensional surfaces so that the GPU 150 can render to one two-dimensional surface while a second two-dimensional surface is used to drive the display 170.

The GPU 150 includes a vertex shader 152, a geometry shader 154 and a fragment shader 156. As is well-known, the vertex shader 152 receives a sequence of one or more sets of vertex attributes, where each set of vertex attributes is typically associated with one vertex and one or more vertices are associated with a geometric primitive. The vertex shader 152 processes the vertex attributes, performing such operations as evaluating the vertex's position relative to the viewer and evaluating lighting equations to determine each vertex color. The vertex shader 152 may also use data from buffers stored in the GPU local memory 160. For example, the vertex shader 152 may use data from the uniform storage buffer 164 or the texture buffer 166. The machine code vertex shader program 124 executes on the vertex shader 152, imparting specific processing behavior according to specific requirements and specifications of the application program 112. The geometry shader 154 receives sets of processed vertices from the vertex shader 152. The geometry shader 154 performs per-primitive operations on vertices grouped into primitives such as triangles, lines, strips and points emitted by the vertex shader 152, enabling functionality such as shadow volume generation and procedural synthesis. The machine code geometry shader program 126 executes on the geometry shader 154, imparting specific processing behavior according to specific requirements and specifications of the application program 112. A fixed-function rasterizer (not shown) that is situated between the geometry shader 154 and the fragment shader 156 scan converts an individual geometric primitive into a set of fragments with interpolated vertex attributes. The fragment shader 156 processes the fragments, each containing fragment data, which may include raster position, depth or interpolated vertex attributes, such as texture coordinates, opacity, and other relevant per-pixel data, to produce final pixel values. The final pixel values are stored in the frame buffer 168 by a fixed-function raster operations unit (not shown) that also performs operations such as depth and stencil tests as well as any blending of the final pixel values with values currently stored in the frame buffer. The machine code fragment shader program 128 executes on the fragment shader 156, resulting in specific processing behavior according to specific requirements and specifications of the application program 112.

The display 170 is an output device capable of emitting a visual image corresponding to an input data signal. For example, the display may be built using a cathode ray tube (CRT) monitor, a liquid crystal display, or any other suitable display system. The input data signal to the display 170 is typically generated by scanning out the contents of one or more frames of image data that is stored in the frame buffer 168.

Figure 2:
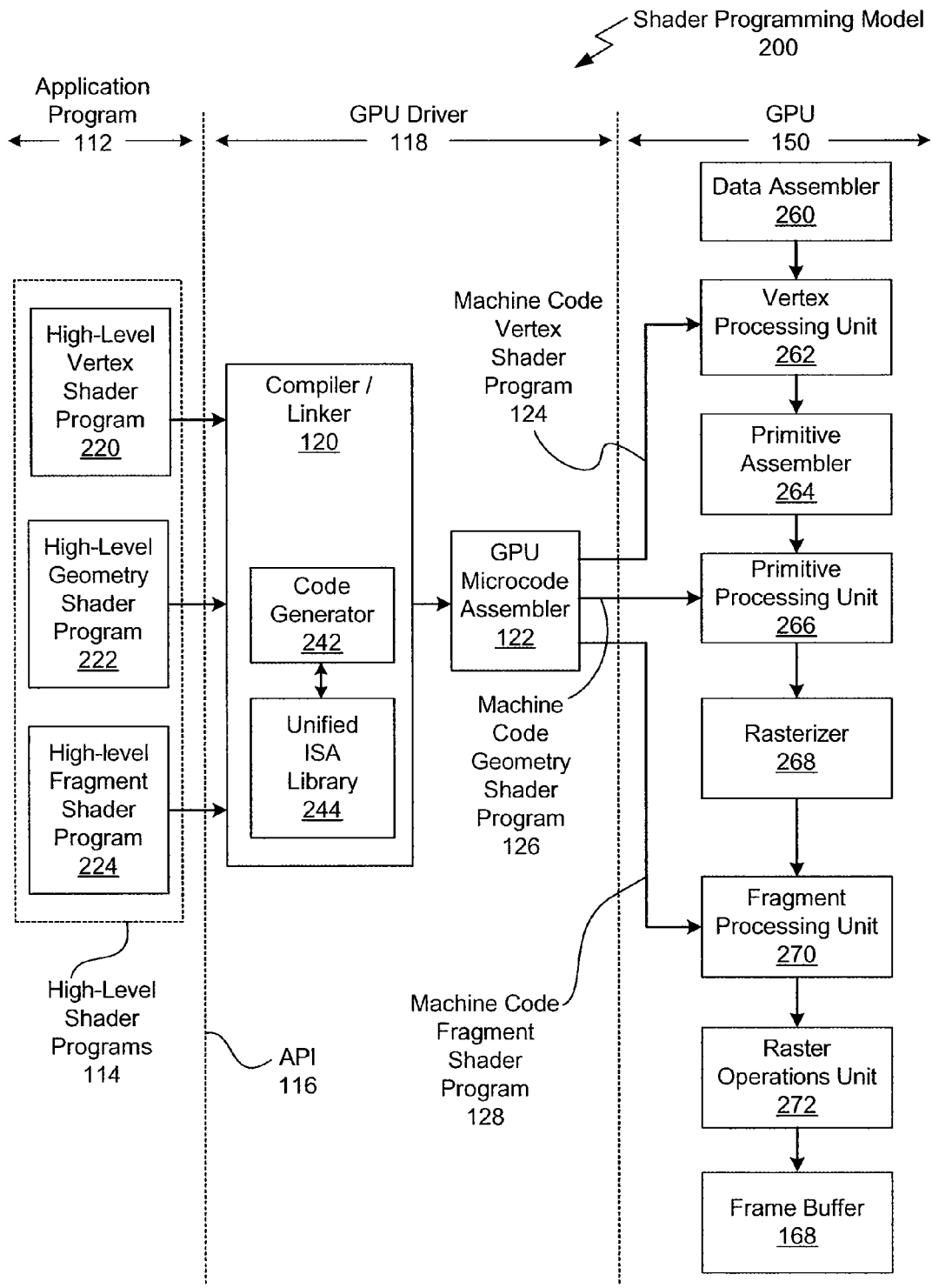
FIG. 2 is a conceptual diagram of a shader programming model, according to one embodiment of the present invention.

FIG. 2 is a conceptual diagram of a shader programming model 200, according to one embodiment of the present invention. As shown, the shader programming model 200 includes the application program 112, which transmits high-level shader programs 114 to the GPU driver 118. The GPU driver then 118 generates machine code programs that are used within the GPU 150 to specify shader behavior within the different processing domains of the GPU 150.

The high-level shader programs 114 may include a high-level vertex shader program 220, a high-level geometry shader program 222 and a high-level fragment shader program 224. Each of the high-level shader programs 114 is transmitted through the API 116 to the compiler/linker 120 within the GPU driver 118. The compiler/linker 120 compiles the high-level shader programs 114 into assembly language program objects. The compiler/linker 120 and optimizations related to linking shader programs for concurrent execution are discussed in greater detail in the patent application titled, "Optimized Chaining of Vertex and Fragment Programs," filed on Jul. 2, 2004 and having U.S. patent application Ser. No. 10/883,893. The subject matter of this patent application is hereby incorporated by reference in its entirety.

Under shader programming model 200, domain-specific shader programs, such as high-level vertex shader program 220, high-level geometry shader program 222, and high-level fragment shader program 224, are compiled using a common instruction set target, supported by unified instruction set architecture (ISA) library 244. With the common instruction set, application developers can compile high-level shader programs in different domains using a core set of instructions having the same syntax and consequently should expect faster compile times for such shader programs. One example of this common ISA is supported by the Unified Instruction Set Architecture ("ISA") developed by NVIDIA Corporation, Santa Clara, U.S.A. The details of the Unified ISA are fully disclosed in the U.S. patent application titled, "A Unified Assembly Instruction Set for Graphics Processing," filed on Oct. 10, 2006 and having application Ser. No. 11/548,241. The subject matter of this application is hereby incorporated by reference in its entirety.

Compiler/linker 120, which includes code generator 242 and unified ISA library 244, provides cross-domain linking capabilities. Specifically, compiler/linker 120 translates the high-level shader programs designated for different domains (e.g., high-level vertex shader program 220, high-level geometry shader program 222, and high-level fragment shader program 224), which are written in high-level shading language, into distinct compiled software objects in the form of assembly code. Further, instead of sending these compiled objects of assembly code individually to separate GPU microcode assemblers (not shown), compiler/linker 120 also "links" the compiled assembly code to generate a single compiled/linked program object, also in the form of either assembly code or machine code. To link multiple compiled objects from different domains (also referred to as to "rendezvous"), compiler/linker 120 needs to reconcile the use of symbols across the domains. Specifically, there are generally two types of symbols, the first type being defined or exported symbols, and the second type being undefined or imported symbols. The first type of symbols broadly refers to functions or variables that are present in one compiled object (e.g., vertex shader assembly code) and should be made available for use by other compiled objects (e.g., geometry shader assembly code and/or fragment shader assembly code). The second type of symbols broadly refers to functions or variables that are called or referenced by one compiled object (e.g., vertex shader assembly code) but are not internally defined within this compiled object.

Additionally, compiler/linker 120 supports two types of linking, linking by name and linking by semantics. To illustrate linking by name, suppose Color is the name of a variable containing color values to be passed from the vertex shader program to the fragment shader program. Suppose also that Color is defined in this vertex shader program. In programming model 200, compiler/linker 120 facilitates the establishment and maintenance of the input/output relationship between high-level vertex shader program 220 and, for example, high-level geometry shader program 222 without requiring any explicit variables-to-hardware mappings in the shader programs, so long as the two shader programs use the name Color consistently. To link by semantics, on the other hand, the variable names are not required to be the same. While GLSL generally does not link by semantics, an exception within GLSL is where built-in names have semantic association. For example, gl_Position refers to the position of a vertex, gl_Color refers to the color of a fragment and gl_TexCoord[0] refers to the first of a set of texture coordinates for a vertex or fragment. A second use of linking by semantics occurs with the use of BindFragDataLocation NV( ) described in greater detail herein. Suppose high-level vertex shader program 220 uses a variable with the name of Vertex_Color for storing the color type X to be passed to high-level geometry shader program 220, and high-level geometry shader program 222 uses a variable with the name of Geometry Color for receiving the color type X. In this scenario, compiler/linker 120 is still capable of establishing and maintaining the input/output relationship between high-level vertex shader program 220 and high-level geometry shader program 222, so long as Vertex Color and Geometry Color are assigned the same semantics corresponding to the color type X.

The program objects are transmitted to the GPU microcode assembler 122, which generates machine code programs, including a machine code vertex shader program 124, a machine code geometry shader program 126 and a machine code fragment shader program 128. The machine code vertex shader program 124 is transmitted to a vertex processing unit 262 for execution. Similarly, the machine code geometry shader program 126 is transmitted to a primitive processing unit 266 for execution and the machine code fragment shader program 128 is transmitted to a fragment processing unit 270 for execution.

A data assembler 260 and the vertex processing unit 262 function as the vertex shader 152 of FIG. 1. The data assembler 260 is a fixed-function unit that collects vertex data for high-order surfaces, primitives, and the like, and outputs the vertex data to vertex processing unit 262. The data assembler 260 may gather data from buffers stored within system memory 110 and GPU local memory 160 as well as from API calls from the application program 112 used to specify vertex attributes. The vertex processing unit 262 is a programmable execution unit that is configured to execute a machine code vertex shader program 124, transforming vertex data as specified by the vertex shader programs. For example, vertex processing unit 262 may be programmed to transform the vertex data from an object-based coordinate representation (object space) to an alternatively based coordinate system such as world space or normalized device coordinates (NDC) space. The vertex processing unit 262 may read texture map data as well as uniform data that is stored in GPU local memory 160 through an interface (not shown) for use in processing the vertex data. The vertex shader 152 represents the vertex processing domain of the GPU 150.

A primitive assembler 264 and the primitive processing unit 266 function as the geometry shader 154. A second primitive assembler (not shown) may be included subsequent to the primitive processing unit 266 in the data flow through the GPU 150. The primitive assembler 264 is fixed-function unit that receives processed vertex data from vertex processing unit 262 and constructs graphics primitives, e.g., points, lines, triangles, or the like, for processing by primitive processing unit 266. In prior art systems, the primitive processing unit performs well-known, fixed-function viewport operations such as clipping, projection and related transformations on the incoming vertex data. In the GPU 150, the primitive processing unit 266 is a programmable execution unit that is configured to execute machine code geometry shader program 126 to process graphics primitives received from the primitive assembler 264 as specified by the geometry shader program 126. For example, in addition to well-known viewport operations, the primitive processing unit 266 may be programmed to subdivide the graphics primitives into one or more new graphics primitives and calculate parameters, such as plane equation coefficients, that are used to rasterize the new graphics primitives. The primitive processing unit 266 may read texture map data that is stored in GPU local memory 160 through an interface (not shown) for use in processing the geometry data. The geometry shader 154 represents the geometry processing domain of the GPU 150. The primitive processing unit 266 outputs the parameters and new graphics primitives to a rasterizer 268. The rasterizer 268 is a fixed-function unit that scan converts the new graphics primitives and outputs fragments and coverage data to the fragment processing unit 270.

The fragment processing unit 270 performs the functions of the fragment shader 156 of FIG. 1. The fragment processing unit 270 is a programmable execution unit that is configured to execute machine code fragment shader programs 128 to transform fragments received from rasterizer 268 as specified by the machine code fragment shader program 128. For example, the fragment processing unit 270 may be programmed to perform operations such as perspective correction, texture mapping, shading, blending, and the like, to produce shaded fragments that are output to a raster operations unit 272. The fragment processing unit 270 may read texture map data as well as uniform data that is stored in local memory 160 through an interface (not shown) for use in processing the fragment data. The raster operations unit 272 optionally performs fixed-function computations such as near and far plane clipping and raster operations, such as stencil, z test and the like, and outputs pixel data as processed graphics data for storage in a buffer in the GPU local memory 160, such as the frame buffer 168.

Figure 3:
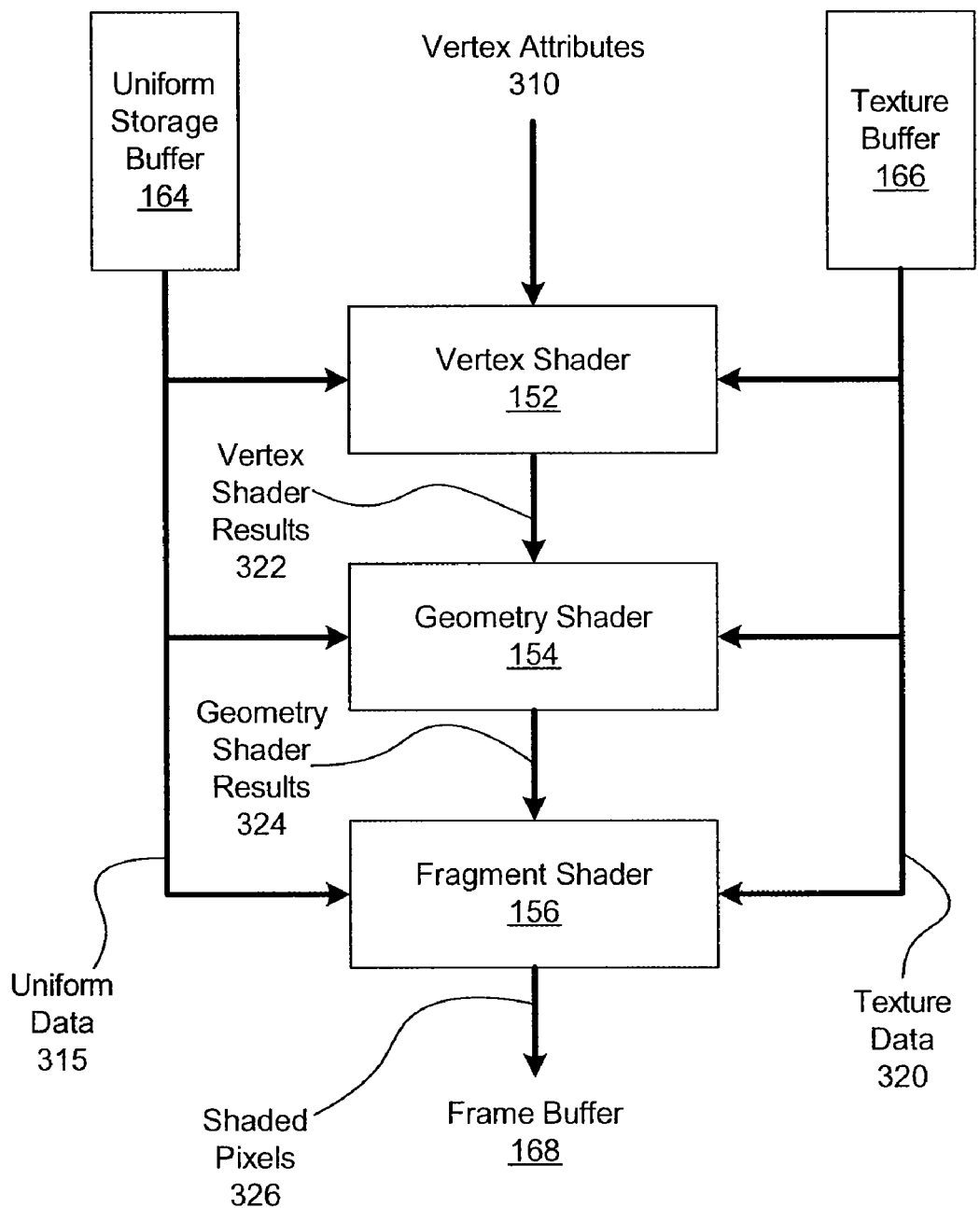
FIG. 3 is a data flow diagram of a programmable graphics pipeline residing within the GPU of FIG. 1, according to one embodiment of the present invention.

FIG. 3 is a data flow diagram of a programmable graphics pipeline residing within the GPU of FIG. 1, according to one embodiment of the present invention. The vertex shader 152, the geometry shader 154 and the fragment shader 156 of FIG. 1 are configured according to the shader programming model 200 of FIG. 2. The vertex shader 152 executes the machine code vertex shader program 124 in order to process a stream of vertex attributes 310. The vertex shader 152 may access data from additional sources, such as uniform data 315 from the uniform storage buffer 164 and texture data 320 from the texture buffer 166. The vertex shader results 322 are transmitted to the geometry shader 154, which processes the vertex shader results 322 according to the machine code geometry shader program 126. The geometry shader 154 may access data from additional sources, such as uniform data 315 from the uniform storage buffer 164 and texture data 320 from the texture buffer 166. The geometry shader results 324 are transmitted to the fragment shader 156. The fragment shader 156 executes the machine code fragment shader program 128 in order to process the geometry shader results 324. The fragment shader 156 may access data from additional sources, such as uniform data 315 from the uniform storage buffer 164 and texture data 320 from the texture buffer 166. The output of the fragment shader 156 includes a stream of shaded pixels 326 that are written to the frame buffer 168.

In prior art systems, the vertex shader results 322, geometry shader results 324, uniform data 315 and texture data 320 are typically a collection of floating-point values and the shaded pixels 326 are written to fixed-structure buffers within the frame buffer 168. As previously described herein, some new generation GPUs augment this type of floating-point support with full integer support. Full integer support includes, without limitation, API support to specify shader inputs as integer values as well as data processing within each functional unit, data transmission between functional units and data storage within the programmable graphics pipeline and the GPU local memory 160, enabling a mix of both integers and floating-point values within the vertex attributes 310, values of uniforms within the uniform storage buffer 164, values within the texture buffer 166, vertex shader results 322, geometry shader results 324, shaded pixels 326, uniform data 315 and texture data 320. To provide the new integer support within a GPU to shader program developers, the present invention extends GLSL to incorporate, among other things, integer functions and integer data storage types. A more specific description of the OpenGL™ extensions that support full integer processing is set forth below in the next section of the present application.

Flat shading is a rasterizer feature were the attribute value of all fragments generated for a given point, line or triangle is taken from the corresponding value of a single vertex. One new processing capability enabled by the OpenGL™ extensions described herein is a generalization of flat shading to include any parameter passed from one functional unit to the next. In prior art systems, flat shading was possible only on specific floating-point vertex attributes. However, with the introduction of full integer support within the processing model of the API, a flat shaded integer value is now possible across all parameters. The OpenGL™ extensions pertaining to flat shading are also set forth in the following section.

Another newly enabled processing capability generalizes the output of the fragment shader to include named output buffers within the frame buffer. In prior art systems that include strongly typed high-level shading languages, only fixed-frame buffer output structures, such as floating-point vectors are possible. However, with full integer support for programmatically representing integer values within the fragment shader, including buffer address indices, named buffers are now enabled within the OpenGL™ API. Again, the OpenGL™ extensions pertaining to named output buffers are also set forth in the following section.

In sum, native integer math data types and operations are added to OpenGL's™ GLSL, allowing developers of shader programs to take advantage of native math functionality recently incorporated within advanced graphics processing units. Linking between shader programs that, in combination, may span the vertex, geometry and fragment domains enables the optimization of varying variables of both integer and floating-point data types across the different domains. New capabilities are also enabled, such as the ability to flat shade any parameter passed from one shader to another as well as the ability to incorporate named output buffers within the fragment shader program, by virtue of making the full integer processing capabilities of advanced graphics processing units available to graphics application developers.

The Integer Application Programming Interface Extensions

Extensions to the OpenGL Shading Language (GLSL) and related APIs to support native integer processing are discussed in this section. Persons skilled in the art will appreciate that the information in this section should be considered in conjunction with the current OpenGL 2.0™ specification.

Importantly, the extensions presented herein introduce two new integer data types: a signed 32-bit integer type that is represented in two's-compliment format and an unsigned 32-bit integer type. The signed 32-bit integer has a type of "int" while the unsigned 32-bit integer has a type of "unsigned int" or simply "uint." Functional extensions that operate on these new integer data types are listed below in TABLE 1. Signed integers include the variables "ai," "bi" and "zi." Unsigned integers include the variables "au," "bu" and "zu." The variable "n" indicates a positive count and may be a signed or unsigned integer value. The variable "af" is a floating-point type. While prior art systems included integer variables to conveniently represent basic counting and looping variables, any computation using such variables was not guaranteed to be performed using native integers, precluding the use of any bitwise operators. Furthermore, the total range of values was limited, typically to 16-bit values.

TABLE 1

| Function | Operation |
| --- | --- |
| Signed Addition | zi = ai + bi |
| Absolute Value | zi = abs (ai) |
| Unsigned Multiplication | zu = au * bu |
| Signed Multiplication | zi = ai * bi |
| Signed Negate | Zi = −ai |
| Bitwise exclusive-"or" | zu = au ^ bu |
| Bitwise invert | zu = ~au |
| Bitwise "and" | zu = au & bu |
| Bitwise "or" | zu = au \| bu |
| Signed Shift Left | zi = ai << n |
| Signed Shift Right | zi = ai >> n |
| Unsigned Shift Left | zu = au << n |
| Unsigned Shift Right | zu = au >> n |
| Round to closest integer | zi = ROUND (af) |
| Truncate to integer | zi = TRUNC (af) |

The math functions and bitwise operators shown in TABLE 1 are performed according to well-known techniques in the field of computer arithmetic. The ROUND ( ) function selects the integer value closest to the corresponding input floating-point value. The TRUNC ( ) function truncates the fractional portion of a floating-point value to yield an integer value.

With the addition of integer data types, new functions and structures are added to the GLSL function library. TABLE 2 sets forth new API commands for specifying integer vertex attribute data. Additionally, fragment shaders can define their own output variables, and declare these output variables to be of type floating-point, integer or unsigned integer. These variables are bound to a fragment color index with the new API command BindFragDataLocationNV( ) and directed to buffers using the existing DrawBuffer( ) or DrawBuffers( ) API commands. Data may be retrieved using GetFragDataLocationNV( )

TABLE 2

| Type | Function Name | Arguments |
| --- | --- | --- |
| void | VertexAttribI1iNV | (uint index, int x); |
| void | VertexAttribI2iNV | (uint index, int x, int y); |
| void | VertexAttribI3iNV | (uint index, int x, int y, int z); |
| void | VertexAttribI4iNV | (uint index, int x, int y, int z, int w); |
| void | VertexAttribI1uiNV | (uint index, uint x); |
| void | VertexAttribI2uiNV | (uint index, uint x, uint y); |
| void | VertexAttribI3uiNV | (uint index, uint x, uint y, uint z); |
| void | VertexAttribI4uiNV | (uint index, uint x, uint y, uint z, uint w); |
| void | VertexAttribI1ivNV | (uint index, const int *v); |
| void | VertexAttribI2ivNV | (uint index, const int *v); |
| void | VertexAttribI3ivNV | (uint index, const int *v); |
| void | VertexAttribI4ivNV | (uint index, const int *v); |
| void | VertexAttribI1uivNV | (uint index, const uint *v); |
| void | VertexAttribI2uivNV | (uint index, const uint *v); |
| void | VertexAttribI3uivNV | (uint index, const uint *v); |
| void | VertexAttribI4uivNV | (uint index, const uint *v); |
| void | VertexAttribI4bvNV | (uint index, const byte *v); |
| void | VertexAttribI4svNV | (uint index, const short *v); |
| void | VertexAttribI4ubvNV | (uint index, const ubyte *v); |
| void | VertexAttribI4usvNV | (uint index, const ushort *v); |
| void | VertexAttribIPointerNV | (uint index, int size, enum type, sizei stride, const void *pointer); |
| void | GetVertexAttribIivNV | (uint index, enum pname, int *params); |
| void | GetVertexAttribIuivNV | (uint index, enum pname, uint *params); |
| void | Uniform1uiNV | (int location, uint v0); |
| void | Uniform2uiNV | (int location, uint v0, uint v1); |
| void | Uniform3uiNV | (int location, uint v0, uint v1, uint v2); |
| void | Uniform4uiNV | (int location, uint v0, uint v1, uint v2, uint v3); |
| void | Uniform1uivNV | (int location, sizei count, const uint *value); |
| void | Uniform2uivNV | (int location, sizei count, const uint *value); |
| void | Uniform3uivNV | (int location, sizei count, const uint *value); |
| void | Uniform4uivNV | (int location, sizei count, const uint *value); |
| void | GetUniformuiv | (uint program, int location, uint *params); |
| void | BindFragData LocationNV | (uint program, uint colorNumber, const char *name); |
| int | GetFragData LocationNV | (uint program, const char *name); |

TABLE 3 sets forth a new integer token type that is accepted by the <pname> parameters of the API commands, including, without limitation, GetVertexAttribdv( ) GetVertexAttribfv( ) GetVertexAttribiv( ) GetVertexAttribIuivNV( ) and GetVertexAttribIivNV( ).

TABLE 3

| Token Name | Token Numeric Value |
| --- | --- |
| VERTEX_ATTRIB_ARRAY_INTEGER_NV | 0x88FD |

TABLE 4 sets forth new integer token types that are accepted by the function GetActiveUniform( ) as return values for the corresponding return <type> parameter.

TABLE 4

| Token Name | Token Numeric Value |
| --- | --- |
| UNSIGNED_INT | 0x1405 |
| UNSIGNED_INT_VEC2_NV | 0x8DC6 |
| UNSIGNED_INT_VEC3_NV | 0x8DC7 |
| UNSIGNED_INT_VEC4_NV | 0x8DC8 |
| INT_SAMPLER_1D_NV | 0x8DC9 |
| INT_SAMPLER_2D_NV | 0x8DCA |
| INT_SAMPLER_3D_NV | 0x8DCB |

TABLE 4-continued

| Token Name | Token Numeric Value |
|---|---|
| INT_SAMPLER_CUBE_NV | 0x8DCC |
| INT_SAMPLER_2D_RECT_NV | 0x8DCD |
| INT_SAMPLER_1D_ARRAY_NV | 0x8DCE |
| INT_SAMPLER_2D_ARRAY_NV | 0x8DCF |
| INT_SAMPLER_BUFFER_NV | 0x8DD0 |
| UNSIGNED_INT_SAMPLER_1D_NV | 0x8DD1 |
| UNSIGNED_INT_SAMPLER_2D_NV | 0x8DD2 |
| UNSIGNED_INT_SAMPLER_3D_NV | 0x8DD3 |
| UNSIGNED_INT_SAMPLER_CUBE_NV | 0x8DD4 |
| UNSIGNED_INT_SAMPLER_2D_RECT_NV | 0x8DD5 |
| UNSIGNED_INT_SAMPLER_1D_ARRAY_NV | 0x8DD6 |
| UNSIGNED_INT_SAMPLER_2D_ARRAY_NV | 0x8DD7 |
| UNSIGNED_INT_SAMPLER_BUFFER_NV | 0x8DD8 |

TABLE 5 sets forth new integer token types that are accepted by the <pname> parameters of the API commands, including, without limitation theGetBooleanv( ) GetIntegerv( ) GetFloatv( ) and GetDoublev( )

TABLE 5

| Token Name | Token Numeric Value |
|---|---|
| MIN_PROGRAM_TEXEL_OFFSET_NV | 0x8904 |
| MAX_PROGRAM_TEXEL_OFFSET_NV | 0x8905 |

With full integer support within the GPU, integer vertex attributes may be declared as signed or unsigned integers. To load integer vertex attributes while preserving the proper integer data type, a vertex shader program should use the commands set forth below in TABLE 6:

TABLE 6

| Type | Function Name | Arguments |
|---|---|---|
| Void | VertexAttribI[1234]{i,ui}NV | (uint index, T values); |
| Void | VertexAttribI[1234]{i,ui}vNV | (uint index, T values); |
| Void | VertexAttribI4{b, s, ub, us}vNV | (uint index, T values); |

The VertexAttribI* command should match the type of the attribute declared in the vertex shader. In the event of a type mismatch, the attribute values may be undefined. This means that the unsigned versions of the VertexAttribI* commands should be used to load data for unsigned integer vertex attributes or vectors, and the signed versions of the VertexAttribI* commands should be used for signed integer vertex attributes or vectors. This also means that the VertexAttribI* commands should not be used to load data for a vertex attribute declared as a float, float vector or matrix, otherwise their values are undefined. By enforcing a policy of matching types within the API, a single set of registers within the GPU 150 may be used for storing vertex attributes of different data types. Die area within the GPU 150 is thereby saved by avoiding the use of additional registers to store each different type of attribute data.

The <index> parameter in the well-known VertexAttribPointer( ) command and the newly disclosed VertexAttribIPointerNV( ) command identifies the generic vertex attribute array being described. The error INVALID_VALUE is generated if <index> is greater than or equal to MAX_VERTEX_ATTRIBS. Generic attribute arrays with integer <type> arguments can be handled in one of three ways: converted to float by normalizing to [0,1] or [−1,1], converted directly to float, or left as integers. Data for an array specified by VertexAttribPointer( ) is converted to floating-point by normalizing if the <normalized> parameter is TRUE, and converted directly to floating-point otherwise. Data for an array specified by VertexAttribIPointerNV is stored using un-modified integer values. The following command specifies a vertex attribute pointer using integer data types:

| void VertexAttribIPointerNV | (uint index, int size, enum type, sizei stride, const void *pointer); |
|---|---|

TABLE 7 specifies vertex array sizes (values per vertex) and data types. The "integer handling" column indicates how fixed-point data types are handled: "cast" means that they converted to floating-point directly, "normalize" means that they are converted to floating-point by normalizing to [0,1] (for unsigned types) or [−1,1] (for signed types), "integer" means that they remain as integer values, and "flag" means that either "cast" or "normalized" applies, depending on the setting of the <normalized> flag in VertexAttribPointer( ):

TABLE 7

| Command | Sizes | Integer Handling | Types |
|---|---|---|---|
| VertexPointer | 2, 3, 4 | cast | . . . |
| NormalPointer | 3 | normalize | . . . |
| ColorPointe | 3, 4 | normalize | . . . |
| SecondaryColorPointer | 3 | normalize | . . . |
| IndexPointer | 1 | cast | . . . |
| FogCoordPointer | 1 | n/a | . . . |
| TexCoordPointer | 1, 2, 3, 4 | cast | . . . |
| EdgeFlagPointer | 1 | integer | . . . |
| VertexAttribPointer | 1, 2, 3, 4 | flag | . . . |
| VertexAttribIPointerNV | 1, 2, 3, 4 | integer | byte, ubyte, short, ushort, int, uint |

The following pseudo-code illustrates the processing of vertex attributes with respect to the use of the different VertexAttrib* commands:

```
for (j = 1; j < genericAttributes; j++) {
    if (generic vertex attribute j array enabled) {
        if (generic vertex attribute j array is a pure integer array)
        {
            VertexAttribI[size][type]vNV      (j, generic vertex attribute j
                                               array element i);
        } else if    (generic vertex attribute j array normalization
                    flag is set and <type> is not FLOAT or DOUBLE) {
            VertexAttrib[size]N[type]v   (j, generic vertex attribute j
                                          array element i);
        } else {
            VertexAttrib[size][type]v    (j, generic vertex attribute j
                                          array element i);
        }
    }
}
if (generic vertex attribute 0 array enabled) {
    if (generic vertex attribute 0 array is a pure integer array) {
        VertexAttribI[size][type]vNV    (0, generic vertex attribute 0
                                         array element i);
    } else if    (generic vertex attribute 0 array normalization flag
                is set and <type> is not FLOAT or DOUBLE) {
        VertexAttrib[size]N[type]v      (0, generic vertex attribute 0
                                         array element i);
    } else {
        VertexAttrib[size][type]v       (0, generic vertex attribute 0
                                         array element i);
    }
}
```

If a vertex or geometry shader is active, the fixed-function flat shading control specified using glShadeModel( ) applies to the built-in varying variables gl_FrontColor, gl_Back- Color, gl_FrontSecondaryColor and gl_BackSecondaryColor. Through the OpenGL Shading Language varying qualifier "flat" any vertex attribute can be flagged to be flat-shaded.

After lighting, clamping or masking and potentially flat shading, vertex attributes, including colors, texture and fog coordinates, shader varying variables and point sizes, computed on a per vertex basis, are clipped. Those attributes associated with a vertex that lies within the clip volume are unaffected by clipping. However, if a primitive is clipped, the attributes assigned to vertices produced by clipping are generated by interpolating attributes along the clipped edge.

For example, suppose the attributes assigned to the two vertices P_1 and P_2 of an unclipped edge be a_1 and a_2. The value of t for a clipped point P is used to obtain the attribute associated with P is given by Equation 1:

$$a = t^* a\_1 + (1-t)^* a\_2 \quad \text{(Equation 1)}$$

If the attribute is specified to use interpolation without perspective correction in a shader (using the "noperspective" keyword), then the attribute associated with P is:

$$a = t'^* a\_1 + (1-t')^* a\_2 \quad \text{(Equation 2)}$$

where, $$t' = (t^* w\_1)/(t^* w\_1 + (1-t)^* w\_2) \quad \text{(Equation 3)}$$

In Equation 3, w_1 and w_2 are the w clip coordinates of P_1 and P_2, respectively. If w_1 or w_2 is either zero or negative, the value of the associated attribute is undefined.

For a vector attribute, multiplying by a scalar means multiplying each vector component by the scalar. Polygon clipping may create a clipped vertex along an edge of the clip volume's boundary. This situation is handled by noting that polygon clipping proceeds by clipping against one plane of the clip volume's boundary at a time. Attribute clipping is done in the same way, so that clipped points always occur at the intersection of polygon edges (possibly already clipped) with the clip volume's boundary.

TABLE 8 sets forth additional return types available from GetActiveUniform( ) that augment the prior art return types available from GetActiveUniform( ) to incorporate integer data types.

TABLE 8

| Type |
| --- |
| INT_SAMPLER_1D_NV, |
| INT_SAMPLER_2D_NV, |
| INT_SAMPLER_3D_NV, |
| INT_SAMPLER_CUBE_NV, |
| INT_SAMPLER_2D_RECT_NV, |
| INT_SAMPLER_1D_ARRAY_NV, |
| INT_SAMPLER_2D_ARRAY_NV, |
| INT_SAMPLER_BUFFER_NV, |
| UNSIGNED_INT, |
| UNSIGNED_INT_VEC2_NV, |
| UNSIGNED_INT_VEC3_NV, |
| UNSIGNED_INT_VEC4_NV, |
| UNSIGNED_INT_SAMPLER_1D_NV, |
| UNSIGNED_INT_SAMPLER_2D_NV, |
| UNSIGNED_INT_SAMPLER_3D_NV, |
| UNSIGNED_INT_SAMPLER_CUBE_NV, |
| UNSIGNED_INT_SAMPLER_2D_RECT_NV, |
| UNSIGNED_INT_SAMPLER_1D_ARRAY_NV, |
| UNSIGNED_INT_SAMPLER_2D_ARRAY_NV, |
| UNSIGNED_INT_SAMPLER_BUFFER_NV. |

The Uniform*ui{v} commands load sets of one to four unsigned integer values into a uniform location defined as a unsigned integer, an unsigned integer vector, an array of unsigned integers or an array of unsigned integer vectors. TABLE 9 lists extensions to the Uniform*ui{v} commands that provide native integer access to uniform data types:

TABLE 9

| Type | Function Name | Arguments |
| --- | --- | --- |
| void | Uniform{1234}uiNV | (int location, T value) |
| void | Uniform{1234}uivNV | (int location, sizei count, T value) |
| void | GetUniformfv | (uint program, int location, float *params) |
| void | GetUniformiv | (uint program, int location, int *params) |
| void | GetUniformuiv | (uint program, int location, uint *params) |

Extending the GLSL texture lookup to include integer texel fetch operations provides the ability to extract a single texel from a specified texture image. The integer coordinates passed to the texel fetch functions are used directly as the texel coordinates (i, j, k) into the texture image. This in turn means the texture image is point-sampled (no filtering is performed). The level of detail accessed is computed by adding the specified level-of-detail parameter <lod> to the base level of the texture, level_base.

The texel fetch functions typically do not perform depth comparisons or access cube maps. Unlike filtered texel accesses, texel fetches typically do not support LOD clamping or any texture wrap mode, and should use a mipmapped minification filter to access any level of detail other than the base level.

Unlike the typical texture map lookup, the results of an integer texel fetch are undefined if any of the following conditions, representing an out-of-bounds lookup request, are true:

1) if the computed LOD is less than the texture's base level (level_base) or greater than the maximum level (level_max),
2) if the computed LOD is not the texture's base level and the texture's minification filter is NEAREST or LINEAR,
3) if the layer specified for array textures is negative or greater than the number of layers in the array texture,
4) if the texel at (i, j, k) coordinates refer to a border texel outside the defined extents of the specified LOD, where:
   a. i<-b_s, j<-b_s, k<-b_s,
   b. i>=w_s-b_s, j>=h_s-b_s, or k>=d_s-b_s,
   where the size parameters (w_s, h_s, d_s, and b_s) refer to the width, height, depth, and border size of the image.
5) if the accessed texture is not complete (or cube complete for cubemaps).

In addition to having access to vertex attributes and uniform variables, vertex shaders can access the read-only built-in variable gl_VertexID. This variable holds the integer index <i> implicitly passed to ArrayElement( ) to specify a given vertex number.

A vertex shader can write to built-in as well as user-defined varying variables. The values associated with a varying variable are typically interpolated across the primitive associated with the corresponding output, unless the varying variable is specified to be flat shaded. For example, the built-in output variables gl_FrontColor, gl_BackColor, gl_FrontSecondaryColor, and gl_BackSecondaryColor hold the front and back colors for the primary and secondary colors for the current vertex. The built-in output variable gl_TexCoordn is an array that holds the set of texture coordinates for the current vertex. The built-in output variable gl_FogFragCoord is used as the "c" value, as described in section 3.10 "Fog" of the OpenGL™ 2.0 specification. The built-in special variable gl_Position is intended to hold the homogeneous vertex position. Writing gl_Position is optional. The built-in special variable gl_ClipVertex holds the vertex coordinate used in the clipping stage, as described in section 2.12 "Clipping" of the OpenGL 2.0™ specification. The built-in special variable gl_PointSize, if written, holds the size of the point to be rasterized, measured in pixels.

Textures with a base internal format of DEPTH_COMPONENT are extended to support texture image specification commands if the target is either TEXTURE_CUBE_MAP or PROXY_TEXTURE_CUBE_MAP. Using this format in conjunction with other targets may result in an INVALID_OPERATION error.

The variable gl_PrimitiveID is a new, read-only variable input to the fragment shader. The integer value of gl_PrimitiveID specifies the ID of the primitive currently being processed. Furthermore, if a geometry shader is active, the built-in variable gl_PrimitiveID contains the ID value emitted by the geometry shader for the provoking vertex. If no geometry shader is active, gl_PrimitiveID is filled with the number of primitives processed by the rasterizer since the last time Begin was called (directly or indirectly via vertex array functions). The first primitive generated after a Begin is numbered zero, and the primitive ID counter is incremented after every individual point, line, or polygon primitive is processed. For polygons drawn in point or line mode, the primitive ID counter is incremented only once, even though multiple points or lines may be drawn. For QUADS and QUAD_STRIP primitives that are decomposed into triangles, the primitive ID is incremented after each complete quad is processed. For POLYGON primitives, the primitive ID counter is undefined. The primitive ID is undefined for fragments generated by DrawPixels( ) or Bitmap( ) Restarting a primitive topology using the primitive restart index has no effect on the primitive ID counter.

A fragment shader can also write to "varying out" variables (varying variables designated as outputs), which are used in the subsequent per-fragment operations. Varying out variables can be used to write floating-point, integer or unsigned integer values destined for buffers attached to a frame buffer object, or destined for color buffers attached to the default frame buffer. The GLSL specification describes the values that may be output by a fragment shader in terms of three built-in variables, gl_FragColor, gl_FragData[n] and gl_FragDepth. This invention extends GLSL to provide varying out variables as a second category of variables that may be used buy the fragment shader to output data. If fragment clamping is enabled, the final fragment color values or the final fragment data values or the final varying out variable values written by a fragment shader are clamped to the range [0,1] and then may be converted to fixed-point. Only user-defined varying out variables declared as a floating-point type are clamped and may be converted. Integer values are not clamped. If fragment clamping is disabled, the final fragment color values or the final fragment data values or the final varying output variable values are typically not modified.

The values of user-defined varying out variables are directed to a color buffer within the frame buffer in a two step process. First the varying out variable is bound to a fragment color by using a reference number. The compiler/linker assigns a reference number to each varying out variable, unless overridden by the command BindFragDataLocationNV( ) The reference number of the fragment color assigned for each user-defined varying out variable can be queried with GetFragDataLocationNV( ) Next, the DrawBuffer or DrawBuffers commands direct each fragment color associated with each reference number to a particular buffer.

The binding of a user-defined varying out variable to a fragment color reference number can be specified explicitly using the command:
void BindFragDataLocationNV (uint program, uint colorNumber,
const char *name);

The BindFragDataLocationNV ( ) command specifies that the varying out variable name in program should be bound to fragment color colorNumber when the program is next linked. If name was bound previously, its assigned binding is replaced with colorNumber. The string referenced by name should be terminated using a null character. The error INVALID_VALUE is generated if colorNumber is equal or greater than MAX_DRAW_BUFFERS. BindFragDataLocationNV( ) has no effect until the program is linked. In particular, it doesn't modify the bindings of varying out variables in a program that has already been linked. The error INVALID OPERATION should be generated if name starts with the reserved "gl_" prefix.

When a program is linked, any varying out variables without a binding specified through BindFragDataLocationNV( ) should automatically be bound to fragment colors by the compiler/linker. Such bindings can be queried using the command GetFragDataLocationNV( ) LinkProgram( ) should fail if the assigned binding of a varying out variable would cause the compiler/linker to reference a non-existent fragment color reference number (one greater than or equal to MAX DRAW_BUFFERS). LinkProgram( ) should also fail if more than one varying out variable is bound to the same reference number.

BindFragDataLocationNV may be issued before any shader objects are attached to a program object. Hence binding any name (except a name starting with "gl_") to a color reference number, including a name that is never used as a varying out variable in any fragment shader object. Assigned bindings for variables that do not exist are ignored. After a program object has been linked successfully, the bindings of varying out variable names to color numbers can be queried. The following command returns the number of the fragment color that the varying out variable name was bound to when the program object program was last linked:
int GetFragDataLocationNV (uint program, const char *name);

The name string should be a null terminated. If program has not been successfully linked, the error "INVALID OPERATION" is generated. If name is not a varying out variable, or if an error occurs, then "−1" is returned.

New data structure types are added to accommodate integer types within existing data types. TABLE 10 sets forth a set of new integer structures added to the OpenGL™ API to accommodate full integer support.

TABLE 10

| Type Name | Description |
| --- | --- |
| unsigned int | An unsigned integer |
| uvec2 | A two component unsigned integer vector |
| uvec3 | A three component unsigned integer vector |
| uvec4 | A four component unsigned integer vector |
| isampler1D | handle for accessing an integer 1D texture |
| isampler2D | handle for accessing an integer 2D texture |
| isampler3D | handle for accessing an integer 3D texture |
| isamplerCube | handle for accessing an integer cube mapped texture |
| isampler2DRect | handle for accessing an integer 2D rectangular texture |
| isampler1DArray | handle for accessing an integer 1D array depth texture with comparison |

TABLE 10-continued

| Type Name | Description |
|---|---|
| isampler2DArray | handle for accessing an integer 2D array depth texture with comparison |
| isamplerBuffer | handle for accessing an integer buffer texture |
| usampler1D | handle for accessing an unsigned integer 1D texture |
| usampler2D | handle for accessing an unsigned integer 2D texture |
| usampler3D | handle for accessing an unsigned integer 3D texture |
| usamplerCube | handle for accessing an unsigned integer cube mapped texture 2D depth texture with comparison |
| usampler2DRect | handle for accessing an unsigned integer 2D rectangular texture |
| usampler1DArray | handle for accessing an unsigned integer 1D array depth texture with comparison |
| usampler2DArray | handle for accessing an unsigned integer 2D array depth texture with comparison |
| usamplerBuffer | handle for accessing an unsigned integer buffer texture |

If a texture with a signed integer internal format is accessed, one of the signed integer sampler types should be used. If a texture with an unsigned integer internal format is accessed, one of the unsigned integer sampler types should be used. Otherwise, one of the default (float) sampler types should be used. If the types of a sampler and the corresponding texture internal format do not match, the result of a texture lookup should be undefined.

If an integer sampler type is used, the result of a texture lookup is an ivec4. If an unsigned integer sampler type is used, the result of a texture lookup is a uvec4. If a default sampler type is used, the result of a texture lookup is a vec4, where each component is in the range [0, 1].

All of the following functions accept integer sampler types in addition to the core "samplerBuffer" sampler type. For example, textureSizeBuffer( ) accepts variables of type samplerBuffer, as shown, as well as the two corresponding integer forms of samplerBuffer, isamplerBuffer (the signed integer form) and usamplerBuffer (the unsigned integer form). Extending the generalization of the previous example to texture lookups, a "samplerXXX" variable returns a vec4, an "isamplerXXX" variable returns an ivec4, and a "usamplerXXX" returns a uvec4. For the textureSize1Darray( ) function, the first (".x") component of the returned vector is filled with the width of the texture image and the second component with the number of layers in the texture array. For the textureSize2Darray( ) function, the first two components (".x" and ".y") of the returned vector are filled with the width and height of the texture image, respectively. The third component (".z") is filled with the number of layers in the texture array. Integer and unsigned texture lookup functions are provided in the API using function overloading. Overloaded functions that use integer or unsigned-integer versions of the sampler types return ivec4 or uvec4 types, respectively. For the "array" versions, the layer of the texture array to access is either coord.t or coord.p, depending on the use of the 1D or 2D texel fetch lookup, respectively. An exception to the generalized API extensions described herein applies to the family of "textureSize" functions, which always return either an integer or integer vector, regardless of the sampler type.

The following commands, set forth in TABLE 11 use integer texture coordinates <coord> to lookup a single texel from the level-of-detail <lod> on the texture bound to <sampler> as described in the OpenGL™ specification under "Texel Fetches."

TABLE 11

| Type | Function Name | Arguments |
|---|---|---|
| vec4 | texelFetch1D | (sampler1D sampler, int coord, int lod) |
| vec4 | texelFetch2D | (sampler2D sampler, ivec2 coord, int lod) |
| vec4 | texelFetch3D | (sampler3D sampler, ivec3 coord, int lod) |
| vec4 | texelFetch2Drect | (sampler2DRect sampler, ivec2 coord, int lod) |
| vec4 | texelFetch1Darray | (sampler1DArray sampler, ivec2 coord, int lod) |
| vec4 | texelFetch2Darray | (sampler2DArray sampler, ivec3 coord, int lod) |

The following functions, set forth in TABLE 12, return the width, height, depth and number of layers for a texture bound to <sampler> at level of detail <lod>.

TABLE 12

| Type | Function Name | Arguments |
|---|---|---|
| int | textureSizeBuffer | (samplerBuffer sampler) |
| int | textureSize1D | (sampler1D sampler, int lod) |
| ivec2 | textureSize2D | (sampler2D sampler, int lod) |
| ivec3 | textureSize3D | (sampler3D sampler, int lod) |
| ivec2 | textureSizeCube | (samplerCube sampler, int lod) |
| ivec2 | textureSize2Drect | (sampler2DRect sampler, int lod) |
| ivec2 | textureSize1Darray | (sampler1DArray sampler, int lod) |
| ivec3 | textureSize2Darray | (sampler2DArray sampler, int lod) |

TABLE 13 sets fort a set of functions used to perform a texture lookup at the coordinate specified by the first element (coord.s) of texture coordinate coord within the layer indicated by the second coordinate coord.t of the 1D texture array currently bound to sampler. The layer being accessed is computed by layer=max (0, min(d−1, floor (coord.t+0.5)) where 'd' is the depth of the texture array.

TABLE 13

| Type | Function Name | Arguments |
|---|---|---|
| vec4 | texture1Darray | (sampler1DArray sampler, vec2 coord [, float bias]) |
| vec4 | texture1DarrayLod | (sampler1DArray sampler, vec2 coord, float lod) |

TABLE 14 sets fort a set of functions used to perform a texture lookup at the coordinate specified by the first two elements (coord.s, coord.t) of texture coordinate coord to perform a texture lookup in the layer indicated by the third coordinate coord.p of the 2D texture array currently bound to sampler. The layer to access is computed by layer=max (0, min(d−1, floor (coord.p+0.5)) where 'd' is the depth of the texture array.

TABLE 14

| Type | Function Name | Arguments |
|---|---|---|
| vec4 | texture2Darray | (sampler2DArray sampler, vec3 coord [, float bias]) |
| vec4 | texture2DarrayLod | (sampler2DArray sampler, vec3 coord, float lod) |

TABLE 15 sets froth a set of functions relevant to shadow mapping. The shadow1Darray( ) and shadow1DarrayLod( ) functions use texture coordinate coord.s to perform a depth comparison lookup on an array layer of the depth texture bound to sampler, as described in version 2.0 of the OpenGL™ specification. The layer being accessed is indicated by the second coordinate coord.t and is computed by layer=max (0, min(d−1, floor (coord.t+0.5)) where 'd' is the depth of the texture array. The third component of coord (coord.p) is used as the R value. The texture bound to sampler should be a depth texture, or results are undefined. The shadow2Darray( ) function uses texture coordinate (coord.s, coord.t) to perform a depth comparison lookup on an array layer of the depth texture bound to sampler, as described in version 2.0 of the OpenGL™ specification. The layer being accessed is indicated by the third coordinate coord.p and is computed by layer=max (0, min(d−1, floor (coord.p+0.5)) where 'd' is the depth of the texture array. The fourth component of coord (coord.q) is used as the R value. The texture bound to sampler should be a depth texture, or results are undefined. The ShadowCube( ) function uses texture coordinate (coord.s, coord.t, coord.p) to perform a depth comparison lookup on the depth cubemap bound to sampler, as described in section 3.8.14 of the OpenGL™ 2.0 specification. The direction of the vector (coord.s, coord.t, coord.p) is used to select which face of the cubemap a 2-dimensional texture lookup is performed on, as described in the OpenGL™ 2.0 specification. The fourth component of coord (coord.q) is used as the R value. The texture bound to sampler should be a depth cubemap, otherwise results are undefined.

TABLE 15

| Type | Function Name | Arguments |
|---|---|---|
| vec4 | shadow1Darray | (sampler1DArrayShadow sampler, vec3 coord, [float bias]) |
| vec4 | shadow1DarrayLod | (sampler1DArrayShadow sampler, vec3 coord, float lod) |
| vec4 | shadow2Darray | (sampler2DArrayShadow sampler, vec4 coord) |
| vec4 | shadowCube | (samplerCubeShadow sampler, vec4 coord) |

TABLE 16 sets forth the "offset" version of each existing texture API function and provides an extra parameter <offset> which is added to the (u, v, w) texel coordinates before looking up each texel. Note that <offset> does not generally apply to the layer coordinate for texture arrays, as explained in detail in section 3.8.7 of the OpenGL™ 2.0 Specification. Note also that texel offsets are generally not supported for cubemaps or buffer textures.

TABLE 16

| Type | Function Name | Arguments |
|---|---|---|
| vec4 | texture1Doffset | (sampler1D sampler, float coord, int offset [, float bias]) |
| vec4 | texture1Dproj-Offset | (sampler1D sampler, vec2 coord, int offset [, float bias]) |
| vec4 | texture1Dproj-Offset | (sampler1D sampler, vec4 coord, int offset [, float bias]) |
| vec4 | texture1Dlod-Offset | (sampler1D sampler, float coord, float lod, int offset) |
| vec4 | texture1Dproj-LodOffset | (sampler1D sampler, vec2 coord, float lod, int offset) |
| vec4 | texture1Dproj-LodOffset | (sampler1D sampler, vec4 coord, float lod, int offset) |
| vec4 | texture2Doffset | (sampler2D sampler, vec2 coord, ivec2 offset [, float bias]) |
| vec4 | texture2Dproj-Offset | (sampler2D sampler, vec3 coord, ivec2 offset [, float bias]) |
| vec4 | texture2Dproj-Offset | (sampler2D sampler, vec4 coord, ivec2 offset [, float bias]) |
| vec4 | texture2Dlod-Offset | (sampler2D sampler, vec2 coord, float lod, ivec2 offset) |
| vec4 | texture2Dproj-LodOffset | (sampler2D sampler, vec3 coord, float lod, ivec2 offset) |
| vec4 | texture2Dproj-LodOffset | (sampler2D sampler, vec4 coord, float lod, ivec2 offset) |
| vec4 | texture3Doffset | (sampler3D sampler, vec3 coord, ivec3 offset [, float bias]) |

TABLE 16-continued

| Type | Function Name | Arguments |
|---|---|---|
| vec4 | texture3Dproj-Offset | (sampler3D sampler, vec4 coord, ivec3 offset [, float bias]) |
| vec4 | texture3Dlod-Offset | (sampler3D sampler, vec3 coord, float lod, ivec3 offset) |
| vec4 | texture3Dproj-LodOffset | (sampler3D sampler, vec4 coord, float lod, ivec3 offset) |
| vec4 | shadow1Doffset | (sampler1DShadow sampler, vec3 coord, int offset [, float bias]) |
| vec4 | shadow2Doffset | (sampler2DShadow sampler, vec3 coord, ivec2 offset [, float bias]) |
| vec4 | shadow1Dproj-Offset | (sampler1DShadow sampler, vec4 coord, int offset [, float bias]) |
| vec4 | shadow2Dproj-Offset | (sampler2DShadow sampler, vec4 coord, ivec2 offset [, float bias]) |
| vec4 | shadow1Dlod-Offset | (sampler1DShadow sampler, vec3 coord, float lod, int offset) |
| vec4 | shadow2Dlod-Offset | (sampler2DShadow sampler, vec3 coord, float lod, ivec2 offset) |
| vec4 | shadow1Dproj-LodOffset | (sampler1DShadow sampler, vec4 coord, float lod, int offset) |
| vec4 | shadow2Dproj-LodOffset | (sampler2DShadow sampler, vec4 coord, float lod, ivec2 offset) |
| vec4 | texture2DrectOffset | (sampler2DRect sampler, vec2 coord, ivec2 offset) |
| vec4 | texture2Drect-ProjOffset | (sampler2DRect sampler, vec3 coord, ivec2 offset) |
| vec4 | texture2Drect-ProjOffset | (sampler2DRect sampler, vec4 coord, ivec2 offset) |
| vec4 | shadow2Drect-Offset | (sampler2DRectShadow sampler, vec3 coord, ivec2 offset) |
| vec4 | shadow2Drect-ProjOffset | (sampler2DRectShadow sampler, vec4 coord, ivec2 offset) |
| vec4 | texelFetch1Doffset | (sampler1D sampler, int coord, int lod, int offset) |
| vec4 | texelFetch2Doffset | (sampler2D sampler, ivec2 coord, int lod, ivec2 offset) |
| vec4 | texelFetch3Doffset | (sampler3D sampler, ivec3 coord, int lod, ivec3 offset) |
| vec4 | texelFetch2-DrectOffset | (sampler2DRect sampler, ivec2 coord, int lod, ivec2 offset) |
| vec4 | texelFetch1-DarrayOffset | (sampler1DArray sampler, ivec2 coord, int lod, int offset) |
| vec4 | texelFetch2-DarrayOffset | (sampler2DArray sampler, ivec3 coord, int lod, ivec2 offset) |
| vec4 | texture1Darray-Offset | (sampler1DArray sampler, vec2 coord, int offset [, float bias]) |
| vec4 | texture1Darray-LodOffset | (sampler1DArrayNv sampler, vec2 coord, float lod, int offset) |
| vec4 | texture2Darray-Offset | (sampler2DArray sampler, vec3 coord, ivec2 offset [, float bias]) |
| vec4 | texture2Darray-LodOffset | (sampler2DArray sampler, vec3 coord, float lod, ivec2 offset) |
| vec4 | shadow1Darray-Offset | (sampler1DArrayShadow sampler, vec3 coord, int offset, [float bias]) |
| vec4 | shadow1Darray-LodOffset | (sampler1DArrayShadow sampler, vec3 coord, float lod, int offset) |
| vec4 | shadow2Darray-Offset | (sampler2DArrayShadow sampler, vec4 coord, ivec2 offset) |
| vec4 | texture1Dgrad-Offset | (sampler1D sampler, float coord, float ddx, float ddy, int offset); |
| vec4 | texture1Dproj-GradOffset | (sampler2D sampler, vec2 coord, float ddx, float ddy, int offset); |
| vec4 | texture1Dproj-GradOffset | (sampler2D sampler, vec4 coord, float ddx, float ddy, int offset); |
| vec4 | texture1Darray-GradOffset | (sampler1D sampler, vec2 coord, float ddx, float ddy, int offset); |
| vec4 | texture2Dgrad-Offset | (sampler2D sampler, vec2 coord, vec2 ddx, vec2 ddy, ivec2 offset); |
| vec4 | texture2Dproj-GradOffset | (sampler2D sampler, vec3 coord, vec2 ddx, vec2 ddy, ivec2 offset); |
| vec4 | texture2Dproj-GradOffset | (sampler2D sampler, vec4 coord, vec2 ddx, vec2 ddy, ivec2 offset); |
| vec4 | texture2Darray-GradOffset | (sampler2D sampler, vec3 coord, vec2 ddx, vec2 ddy, ivec2 offset); |
| vec4 | texture3Dgrad-Offset | (sampler3D sampler, vec3 coord, vec3 ddx, vec3 ddy, ivec3 offset); |
| vec4 | texture3Dproj-GradOffset | (sampler3D sampler, vec4 coord, vec3 ddx, vec3 ddy, ivec3 offset); |

TABLE 16-continued

| Type | Function Name | Arguments |
|---|---|---|
| vec4 | shadow1DgradOffset | (sampler1DShadow sampler, vec3 coord, float ddx, float ddy, int offset); |
| vec4 | shadow1DprojGradOffset | (sampler1DShadow sampler, vec4 coord, float ddx, float ddy, int offset); |
| vec4 | shadow1DarrayGradOffset | (sampler1DShadow sampler, vec3 coord, float ddx, float ddy, int offset); |
| vec4 | shadow2DgradOffset | (sampler2DShadow sampler, vec3 coord, vec2 ddx, vec2 ddy, ivec2 offset); |
| vec4 | shadow2DprojGradOffset | (sampler2DShadow sampler, vec4 coord, vec2 ddx, vec2 ddy, ivec2 offset); |
| vec4 | shadow2DarrayGradOffset | (sampler2DShadow sampler, vec4 coord, vec2 ddx, vec2 ddy, ivec2 offset); |
| vec4 | texture2DrectGradOffset | (sampler2D sampler, vec2 coord, vec2 ddx, vec2 ddy, ivec2 offset); |
| vec4 | texture2DrectProjGradOffset | (sampler2D sampler, vec3 coord, vec2 ddx, vec2 ddy, ivec2 offset); |
| vec4 | texture2DrectProjGradOffset | (sampler2D sampler, vec4 coord, vec2 ddx,vec2 ddy, ivec2 offset); |
| vec4 | shadow2DrectGradOffset | (sampler2DShadow sampler, vec3 coord, vec2 ddx, vec2 ddy, ivec2 offset); |
| vec4 | shadow2DrectProjGradOffset | (sampler2DShadow sampler, vec4 coord, vec2 ddx, vec2 ddy, ivec2 offset); |

While the forgoing is directed to embodiments of the present invention, other and further embodiments of the invention may be devised without departing from the basic scope thereof, and the scope thereof is determined by the claims that follow.

All trademarks are the respective property of their owners.

We claim:

1. A method for processing integer data operations on a graphics processing unit, the method comprising:
    receiving a first shader program configured to be executed by a first shader unit in the graphics processing unit and a second shader program configured to be executed by a second shader unit in the graphics processing unit, wherein both the first shader program and the second shader program include instructions that are written in a high-level shading language and include integer data operations, and wherein the first shader unit and the second shader unit are configured to perform both integer data operations and floating point data operations;
    converting the high-level shading language instructions of the first shader program and the second shader program into assembly code, wherein variables requiring native integer processing are declared in the first shader program and the second shader program as integers in the high-level shading language for execution using only native integer data operations and not using floating point data operations;
    linking the assembly code instructions of the first shader program with the assembly code instructions of the second shader program, wherein a varying out variable written by the second shader program is linked to a fragment color reference number associated with a particular buffer and bindings of varying out variables can be queried using a command that returns a fragment color reference number to which a varying out variable specified as an input to the command was bound when the second shader program was last linked;
    converting the linked assembly code instructions of the first shader program and the second shader program into microcode instructions that can be executed on the graphics processing unit; and
    transmitting the microcode instructions of the first shader program to the first shader unit and the microcode instructions of the second shader program to the second shader unit, wherein the variables declared as integers are executed by the first shader unit and the second shader unit using only integer data operations and not using floating point data operations.

2. The method of claim 1, wherein the integer data operations include a bitwise exclusive- or operation.

3. The method of claim 1, wherein the integer data operations include a bitwise invert operation.

4. The method of claim 1, wherein the integer data operations include a bitwise and operation.

5. The method of claim 1, wherein the integer data operations include a bitwise or operation.

6. The method of claim 1, wherein the integer data operations include a signed shift operation.

7. The method of claim 1, wherein the integer data operations include an unsigned shift operation.

8. The method of claim 1, wherein the integer data operations transmitted to the first shader unit include an operation that allows the first shader unit to access integer values from vertex arrays by normalizing the integer values to [0.1] or [−1,1] to convert the integer values to floating point values when a normalized parameter is true.

9. The method of claim 1, wherein the integer data operations transmitted to the first shader unit include an operation that allows the first shader unit to identify a geometric primitive using a single integer value specified by a read-only variable.

10. The method of claim 1, wherein the integer data operations include a query for an integer width of a texture image and a number of layers of a texture array.

11. The method of claim 1, wherein either the first shader unit or the second shader unit is a geometry shader that can output an integer data type.

12. A non-transitory computer-readable storage medium including instructions that when executed by a processor cause a computing device having a graphics processing unit to process integer data operations by performing the steps of:
    receiving a first shader program configured to be executed by a first shader unit in the graphics processing unit and a second shader program configured to be executed by a second shader unit in the graphics processing unit, wherein both the first shader program and the second shader program include instructions that are written in a high-level shading language and include integer data operations, and wherein the first shader unit and the second shader unit are configured to perform both integer data operations and floating point data operations;
    converting the high-level shading language instructions of the first shader program and the second shader program into assembly code, wherein variables requiring native integer processing are declared in the first shader program and the second shader program as integers in the high-level shading language for execution using only native integer data operations and not using floating point data operations;
    linking the assembly code instructions of the first shader program with the assembly code instructions of the second shader program, wherein a varying out variable written by the second shader program is linked to a fragment color reference number associated with a particular buffer and the bindings of varying out variables are configured to be queried using a command that returns a fragment color reference number to which a varying out variable specified as an input to the command was bound when the second shader program was last linked;

converting the linked assembly code instructions of the first shader program and the second shader program into microcode instructions that can be executed on the graphics processing unit; and transmitting the microcode instructions of the first shader program to the first shader unit and the microcode instructions of the second shader program to the second shader unit, wherein the variables declared as integers are executed by the first shader unit and the second shader unit using only integer data operations and not using floating point data operations.

13. The non-transitory computer-readable storage medium of claim 12, wherein the integer data operations transmitted to the first shader unit include an operation that allows the first shader unit to access integer values from vertex arrays by normalizing the integer values to [0.1] or [−1,1] to convert the integer values to floating point values when a normalized parameter is true.

14. The non-transitory computer-readable storage medium of claim 12, wherein the integer data operations include a query for an integer width of a texture image and a number of layers of a texture array.

15. A computing device configured to process integer data operations, the computing device comprising:
   a graphics processing unit that includes a first shader unit and a second shader unit; and
   a software driver configured to:
      receive a first shader program configured to be executed by the first shader unit in the graphics processing unit and a second shader program configured to be executed by the second shader unit in the graphics processing unit, wherein both the first shader program and the second shader program include instructions that are written in a high-level shading language and include integer data operations, and wherein the first shader unit and the second shader unit are configured to perform both integer data operations and floating point data operations,
      convert the high-level shading language instructions of the first shader program and the second shader program into assembly code, wherein variables requiring native integer processing are declared as integers in the first shader program and the second shader program in the high-level shading language for execution using only native integer data operations and not using floating point data operations,
      link the assembly code instructions of the first shader program with the assembly code instructions of the second shader program, wherein a varying out variable written by the second shader program is linked to a fragment color reference number associated with a particular buffer and the bindings of varying out variables are configured to be queried using a command that returns a fragment color reference number to which a varying out variable specified as an input to the command was bound when the second shader program was last linked,
      convert the linked assembly code instructions of the first shader program and the second shader program into microcode instructions that can be executed on the graphics processing unit, and
      transmit the microcode instructions of the first shader program to the first shader unit and the microcode instructions of the second shader program to the second shader unit, wherein the variables declared as integers are executed by the first shader unit and the second shader unit using only integer data operations and not using floating point data operations.

16. The computing device of claim 15, wherein the integer data operations include a bitwise and operation.

17. The computing device of claim 15, wherein the integer data operations include a bitwise or operation.

18. The computing device of claim 15, wherein the integer data operations include a signed shift operation.

19. The computing device of claim 15, wherein the integer data operations include an unsigned shift operation.

20. The computing device of claim 15, wherein the integer data operations transmitted to the first shader unit include an operation that allows the first shader unit to access integer values from vertex arrays by normalizing the integer values to [0.1] or [−1,1] to convert the integer values to floating point values when a normalized parameter is true.

21. The computing device of claim 15, wherein the integer data operations transmitted to the first shader unit include an operation that allows the first shader unit to identify a geometric primitive using a single integer value specified by a read-only variable.

22. The computing device of claim 15, wherein the integer data operations include a query for an integer width of a texture image and a number of layers of a texture array.

23. The computing device of claim 15, wherein either the first shader unit or the second shader unit is a geometry shader that can output an integer data type.

* * * * *